US012626100B2

(12) United States Patent　　　　　　(10) Patent No.:　　US 12,626,100 B2
Nagargoje　　　　　　　　　　　　　　(45) Date of Patent:　　　May 12, 2026

(54) MESSAGING ACCOUNT MANAGEMENT SYSTEM

(71) Applicant: Twilio Inc., San Francisco, CA (US)

(72) Inventor: Sachin Narayan Nagargoje, Bengaluru (IN)

(73) Assignee: Twilio Inc., San Francisco, CA (US)

( * ) Notice: Subject to any disclaimer, the term of this patent is extended or adjusted under 35 U.S.C. 154(b) by 862 days.

(21) Appl. No.: 17/858,680

(22) Filed: Jul. 6, 2022

(65) Prior Publication Data

US 2024/0013258 A1　　　Jan. 11, 2024

(51) Int. Cl.
　　H04L 51/42　　　　(2022.01)
　　G06N 3/0455　　　(2023.01)
　　H04L 51/212　　　(2022.01)
　　H04L 51/21　　　　(2022.01)

(52) U.S. Cl.
　　CPC ......... G06N 3/0455 (2023.01); H04L 51/212 (2022.05); H04L 51/21 (2022.05)

(58) Field of Classification Search
　　CPC ..... G06N 3/0455; H04L 51/212; H04L 51/21; H04L 51/214; G06F 21/554; G06Q 30/0267
　　See application file for complete search history.

(56) References Cited

U.S. PATENT DOCUMENTS

| 6,195,686 | B1 * | 2/2001 | Moon | H04L 51/066 |
| | | | | 709/200 |
| 11,769,577 | B1 * | 9/2023 | Dods | H04L 9/3228 |
| | | | | 705/50 |
| 11,823,031 | B1 * | 11/2023 | Lutsyshyn | G06N 3/084 |
| 2004/0107259 | A1 * | 6/2004 | Wallace | H04L 51/18 |
| | | | | 709/206 |
| 2004/0128353 | A1 * | 7/2004 | Goodman | H04L 63/104 |
| | | | | 709/204 |
| 2005/0114456 | A1 * | 5/2005 | Mathew | G06Q 10/10 |
| | | | | 709/206 |
| 2005/0195788 | A1 * | 9/2005 | Villain | G06Q 10/107 |
| | | | | 370/341 |
| 2006/0106942 | A1 * | 5/2006 | Shan | H04L 51/214 |
| | | | | 709/240 |
| 2010/0030864 | A1 * | 2/2010 | Petry | H04L 51/212 |
| | | | | 709/206 |
| 2017/0034132 | A1 * | 2/2017 | Pambuccian | G06F 21/6263 |
| 2018/0316640 | A1 * | 11/2018 | Papa | G06Q 30/0269 |
| 2021/0097197 | A1 * | 4/2021 | Kulkarni | G06F 21/6254 |

(Continued)

FOREIGN PATENT DOCUMENTS

WO　　　WO-2009011807 A1 *　1/2006　.............. H04L 51/48

*Primary Examiner* — Hassan Mrabi

(74) *Attorney, Agent, or Firm* — Lowenstein Sandler LLP

(57)　　　　　　ABSTRACT

Systems and methods for messaging system account management can include receiving an electronic message is originated by a customer account for transmission to a recipient and determining an encoded representation of the electronic message by inputting a numeric representation of the electronic message into an autoencoder. They can further include determining a value reflecting a difference between the encoded representation of the electronic message and encoded representations of the previous messages originated by the customer account and responsive to determining that the value reflecting the difference satisfies a predefined condition, transmitting the electronic message to a recipient.

20 Claims, 7 Drawing Sheets

(56)          References Cited

U.S. PATENT DOCUMENTS

| | | | |
|---|---|---|---|
| 2022/0123945 A1* | 4/2022 | Yang | H04L 9/3236 |
| 2022/0224664 A1* | 7/2022 | Thomas | H04L 51/52 |
| 2022/0277102 A1* | 9/2022 | Kim | H04L 9/0643 |
| 2023/0319002 A1* | 10/2023 | Kapinos | H04L 51/56 |
| | | | 709/206 |
| 2023/0351198 A1* | 11/2023 | Kwon | H04L 63/1425 |

* cited by examiner

300

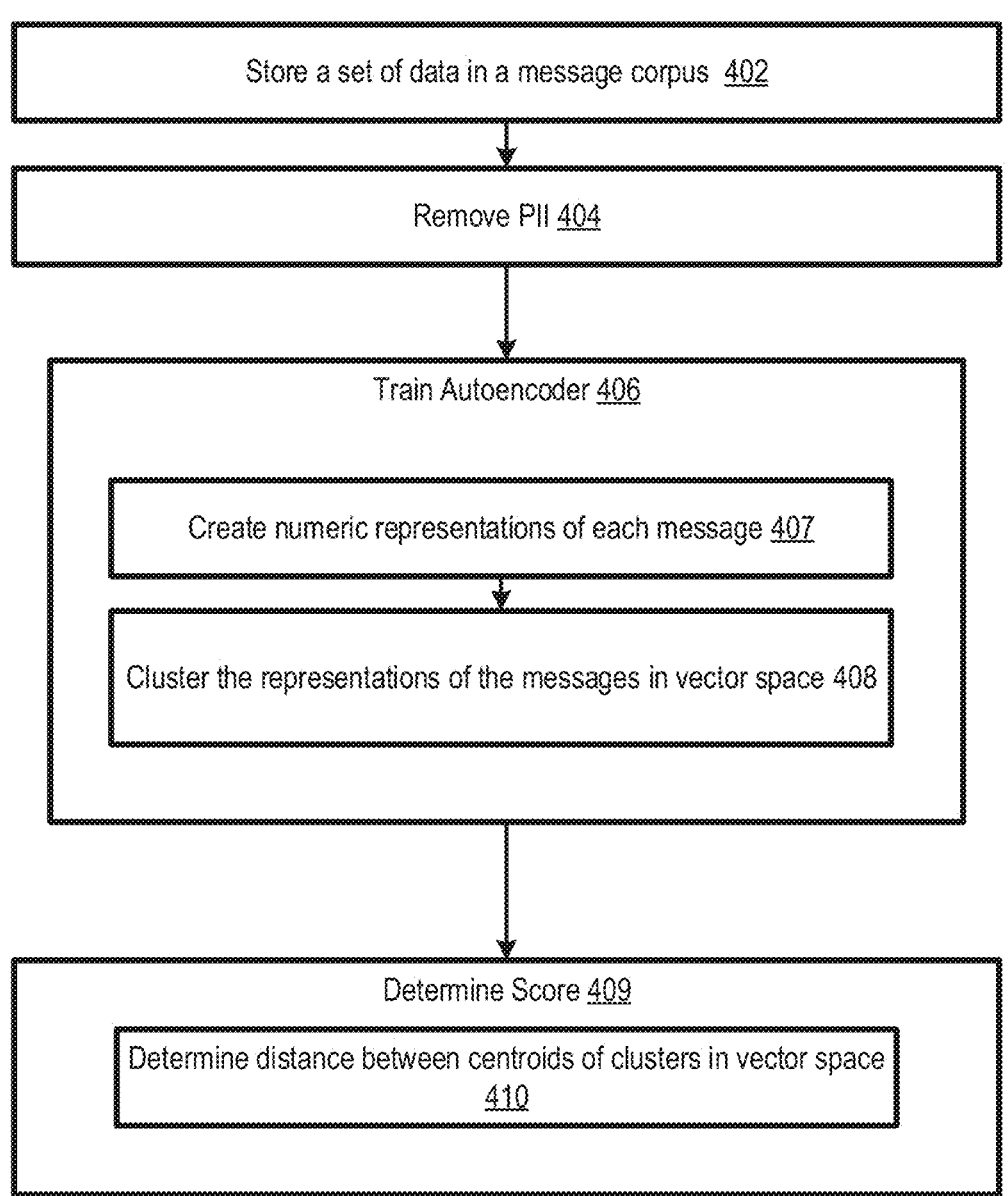
FIG. 4

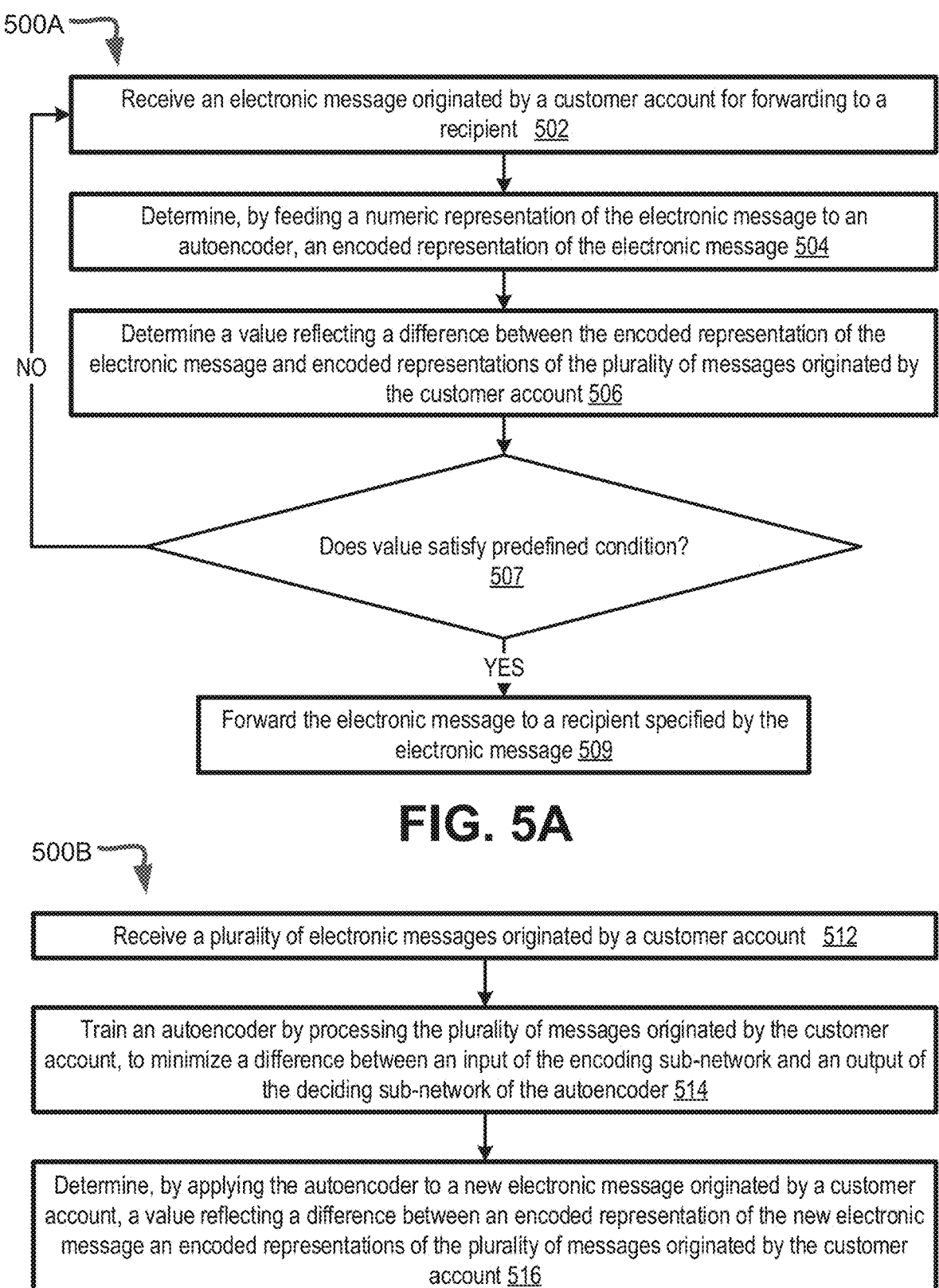

500A

Receive an electronic message originated by a customer account for forwarding to a recipient  502

Determine, by feeding a numeric representation of the electronic message to an autoencoder, an encoded representation of the electronic message 504

Determine a value reflecting a difference between the encoded representation of the electronic message and encoded representations of the plurality of messages originated by the customer account 506

NO

Does value satisfy predefined condition? 507

YES

Forward the electronic message to a recipient specified by the electronic message 509

Receive a plurality of electronic messages originated by a customer account  512

Train an autoencoder by processing the plurality of messages originated by the customer account, to minimize a difference between an input of the encoding sub-network and an output of the deciding sub-network of the autoencoder 514

Determine, by applying the autoencoder to a new electronic message originated by a customer account, a value reflecting a difference between an encoded representation of the new electronic message an encoded representations of the plurality of messages originated by the customer account 516

FIG. 5B

MESSAGING ACCOUNT MANAGEMENT SYSTEM

TECHNICAL FIELD

The implementations of the disclosure relate generally to computer systems and, more specifically, to systems and methods for messaging account management in messaging systems.

BACKGROUND

Messaging systems have become ubiquitous for individuals and customers to communicate with large numbers of message recipients. Such systems can be used as mass messaging systems that incorporate instant messaging (IM) technology that permits real-time transmission of content over a network; email messaging technology that permits structured data to be transmitted in a digital form analogous to physical letters; as well as Short Messaging Service (SMS) and Multimedia Messaging Service (MMS) messaging capabilities that permit short text messages to be transmitted between two or more parties.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding only.

FIG. 4 is a diagram of an example method for autoencoder training and scoring, in accordance with some implementations of the present disclosure;

FIG. 5A is a diagram of an example method for message filtering, in accordance with some implementations of the present disclosure;

FIG. 5B is a diagram of an example method for autoencoder training and application, in accordance with some implementations of the present disclosure;

DETAILED DESCRIPTION

Figure 1:
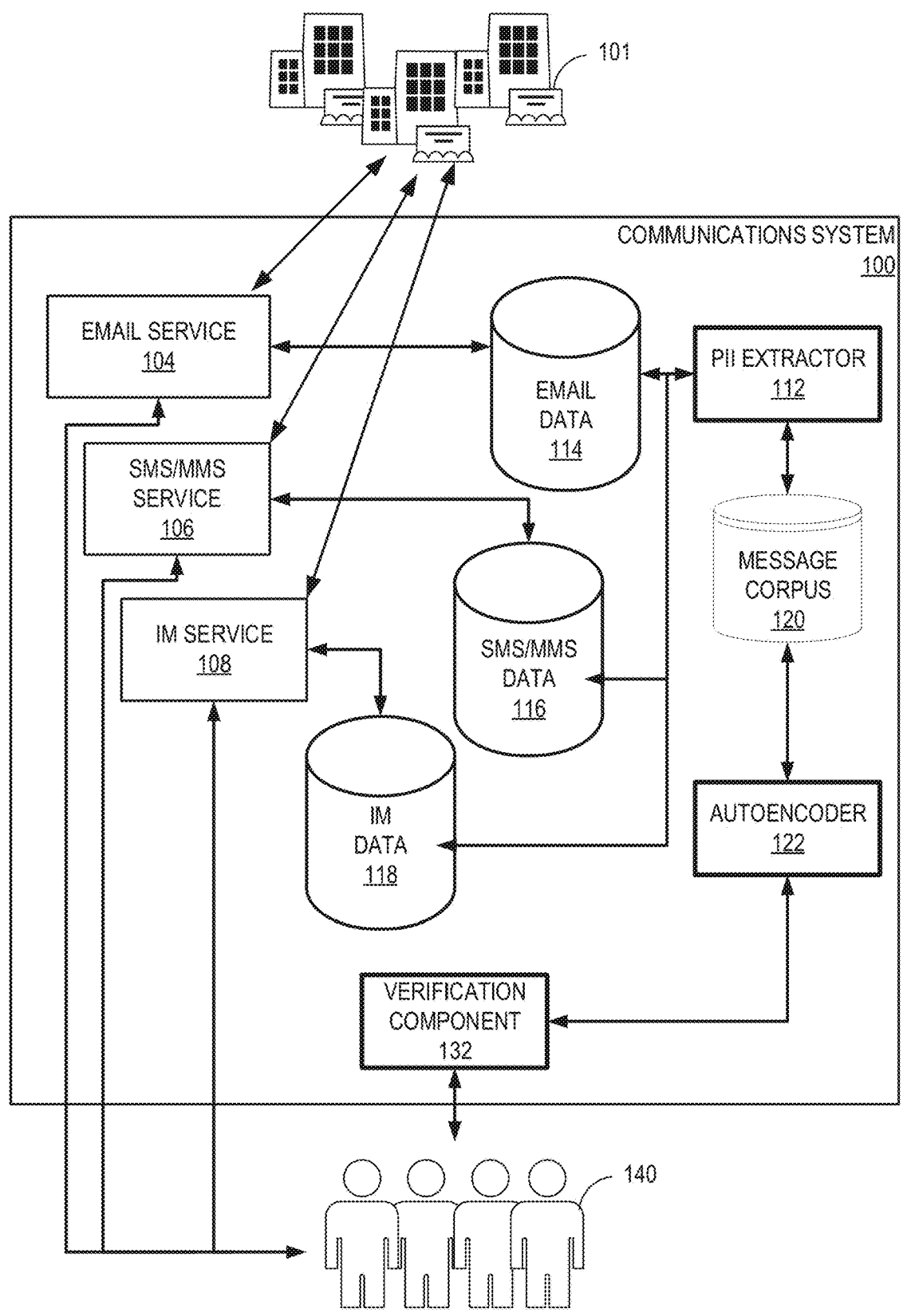
FIG. 1 is a block diagram of a communications system, in accordance with an implementation of the present disclosure.

Implementations of the present disclosure are directed to mechanisms for account verification and for the performance of remedial actions in response to potential account takeover events.

Various messaging systems that provide email messaging services, text and media messaging services such as Short Messaging Service (SMS) and Multimedia Messaging Service (MMS), and instant messaging (IM) services often have accounts that associate a customer with messaging and other data that are sent through the services of the system. While customers of such systems can be individuals, they can also be companies, organizations, and similar large enterprises that use messaging services provided by such systems to transmit messages to large numbers of recipients on a recurring basis over extended periods of time.

The messages and their contents can be varied and can be sent for different purposes. For example, in some cases the customer can send messages to recipients containing notifications and informational updates, while in others, the customer can send messages containing confirmations or clarifications regarding services that have been provided by the customers to the recipients of the messages. The messages sent out by the customers can be part of periodic messaging campaigns or can be a part of a regular recurring communication stream.

Since such systems can be accessed through accounts, each account can be associated with a particular customer and permit the customers to access the features of the systems enabling the customer to conduct their messaging activities. Accounts can be associated with messages that are sent and received by the respective customers and can help track their activities on the system. However, malicious actors can gain access to accounts that do not belong to them and undertake activities under the guise of the actual account holder. Entities that take over other customers' accounts can send messages to recipients that can include illegal, fraudulent, malicious, or otherwise undesirable content. For example, a malicious party can obtain the account access credentials and utilize the customer account for unauthorized email transmissions ("spam").

Manual identification of account takeovers (e.g., detection of compromised accounts and unauthorized activities) that take place with respect to a customer is a labor intensive and time-consuming process. Further, it is often difficult for an individual to manually determine whether a change in a customer's messaging activity is sufficient to indicate that an account has been taken over and therefore requires additional investigation or verification or whether remedial action needs to be taken for a customer account. This results in consumption of additional computing resources and can lead to potential delays in the conduct of a customer's messaging activities and in increased latency in the operation of the messaging system over all. Further, attempting to remedy instances of account takeover and unauthorized messaging activities by other entities creates a significant drain on computing and human resources.

Aspects and implementations of the instant disclosure address the above-noted and other deficiencies by filtering outgoing electronic messages using a neural network that has been trained on a corpus of previously sent electronic messages associated with a given customer account. In some implementations, the neural network may implement an autoencoder, which includes an encoding part ("encoder") comprising a first subset of layers of the neural network and a decoding part ("decoder") comprising a second subset of layers of the neural network. The encoder receives a numeric vector (e.g., a set of embeddings) representing an electronic message and produces an encoded representation of the electronic message. The encoded representation is also a numeric vector, but its size is significantly less (e.g., by at least an order of magnitude) than the size of the original numeric vector. Thus, the encoder reduces the dimensionality of its input. Conversely, the decoder performs a symmetric task (e.g., having received the output of the encoder, it restores the original numeric representation of the electronic message). Accordingly, the autoencoder can be trained in the unsupervised manner (i.e., without requiring a labeled dataset) to minimize the difference between its input (i.e., the input of the encoder) and its output (i.e., the output of the decoder).

Once the autoencoder is trained on a corpus of messages associated with a given customer account, the encoder may be utilized for filtering outgoing email messages originated by the same customer account, under the assumption that legitimate messages (e.g., messages authorized to be sent) originated by the same customer account would share some features (e.g., semantics, context, language, topic, metadata, etc.) that are preserved by the encoder.

In an illustrative example, upon receiving a new electronic message originated by the customer account, the filtering component of a messaging system may input its numeric representation (e.g., embeddings in the form of numeric vector encodings described in more detail below) into the trained encoder which produced an encoded representation of the new electronic message. Then, the difference between this encoded representation and encoded representations of the previously processed corpus of messages originated by the same customer account may be evaluated (e.g., as the smallest distance between the numeric representation vector and centroids of one or more clusters of the numeric representation vectors of the previously processed corpus of messages). Should the difference fall below a predefined threshold, it is determined that the message is legitimate. Conversely, if the difference is determined to be above the threshold for a sufficient number of new messages, a remedial action can be taken with respect to the customer account.

Implementations of the present disclosure further facilitate messaging account management (e.g., account verification and mitigation of account takeover) in messaging systems by providing mechanisms for messaging activity verification and for taking remedial measures in response to potential account takeover. For example, in some implementations, a customer's account can be monitored over a period of time (e.g., a month, a year, etc.) and messaging data (e.g., the contents of the messages and metadata) can be collected as one or more data sets associated with the account. In some implementations, messaging data can be depersonalized (e.g., personally identifiable information (PII) can be extracted) and stored as part of a message corpus in a data store. For example, messaging data can include textual and media content of the data. Additionally, messaging data can contain metadata associated with the messages and can include indicators regarding the language of the messages and the subjects/topics included in the messages. In some implementations, the metadata can include the domain from which the messages are being sent or other identifiers of message origin (e.g., telephone numbers, customer names, addresses etc.). The collection of messaging data, generation of data sets, and transmission of the messages to recipients is described in more detail below with reference to FIG. 1 and FIG. 2 below.

In some implementations, the stored data can be a random sample of messages created or sent during a pre-determined time period by the account. The collection of the messaging data can be conducted continuously or periodically and respective new data sets for each subsequent period of time can be created. In other implementations, a "rolling window" approach can be used whereby, for a moving window of time of a predetermined size (e.g., the past week, month, year etc.), a data set containing messaging data (e.g., data including message content data and message metadata) can be continuously updated with data from new messages while data pertaining to older messages (e.g., messages that have been created or sent outside the bounds of the predetermined time window/period) can be continuously removed from the data set.

In some implementations, this initial set of messaging data can be generated from numeric (e.g., vector) representations of the message contents and the message metadata. For example, the words of each message can be replaced with their respective "word embeddings" whereby each word is represented in the form of a real-valued vector that encodes the meaning of the word such that the words that are closer in the vector space are expected to be similar in meaning. Further, the initial and subsequent sets of messaging data can be generated after the personally identifiable information (PII) is extracted from the message contents and metadata.

This initial set of messaging data can, in some implementations, be stored as a message corpus in a data store and be used to train a machine learning model (e.g., a neural network) and can be referred to herein as a "training data set" or "reference data set". For example, the set of messaging data (e.g., in vector encoded form) can be used as training input for an autoencoder that is trained to classify or otherwise categorize messages according to their similarity to each other. The autoencoder can be trained using encoded representations of both the content of the messages as well as metadata that provides information about the context (e.g., domain of origin, language, topics etc.) of the messages. Accordingly, the autoencoder can be trained for anomaly detection such that by learning to replicate the important features of the training data set, the autoencoder can be incentivized to accurately reproduce the most frequently occurring characteristics of the reference data set of the encoded messaging data. Having trained on the reference data set, if the autoencoder receives anomalous or otherwise dissimilar data as input, it will be reflected in the autoencoder's data reconstruction performance. The operation of an autoencoder, in accordance with an implementation of the present disclosure, is described in more detail below with reference to FIG. 5.

Thus, in some implementations, if after training, the autoencoder receives new messaging data (e.g., in the form of a new data set containing new encoded messaging data not contained in the reference data set), a reconstructions error (e.g., the error between the new input data and the autoencoder's reconstruction of the new input data) can be determined and used to assign an error value to the reconstruction/inference made by the autoencoder. Accordingly, a score serving as a measure of new message legitimacy can be used in some implementations. In the various implementations, the score can be indirectly related to the magnitude of the error value or, can alternatively, be proportionally related to it (e.g., some constant multiple of it). Thus, the score for one or more new messages can be based on the error of the autoencoder's output reconstruction of the newly entered data set representing the one or more new messages. In one implementation, the score can be a probability score (e.g., within a range from 0 to 1) that serves as an indicator of the probability that the newly input data set is anomalous (e.g., deviates from the reference data set).

In some implementations, a criterion or condition can be pre-set which, if met, indicates that the newly input data merits further investigation or action (e.g., remedial action). For example, the criterion can be set such that that if it is satisfied, the satisfaction of the criterion triggers a remedial action for the account associated with the new messaging data set or indicates that the newly input data merits further investigation. In some implementations, the criterion can be a pre-determined threshold value with which the score can be compared.

In some implementations, if the data set containing new messaging data satisfies the criterion (e.g., falls below the threshold value), those messages can be permitted to proceed to be sent to the recipients, while, if they do not satisfy the criterion (e.g., falls above the threshold value), those messages can be prevented from being sent to their recipients by the messaging system.

The described implementations have multiple advantages over the existing technology. Firstly, the automated collection of messages associated with an account permits selective analysis of messaging data sets at different time intervals and frequencies. In some implementations, the depersonalization of the messaging data preserves anonymity and safeguards the privacy of customers and recipients. Secondly, the training of the autoencoder on select data sets associated with particular customers enables accurate and targeted detection of anomalous messaging activity without manual review or investigation. In some implementations, the scoring of new messaging data enables automatic remedial action (e.g., blocking, throttling) without human intervention or monitoring. Conversely, the ability to set thresholds which trigger particular remedial actions can also enable automatic control over whether messages proceed to be sent out to their intended recipients or not (e.g., depending on the score obtained from the autoencoder processing of the new messaging data).

A more detailed overview of the operation of a communication system can be understood with reference to FIG. 1. The depicted diagram illustrates the components and the communication pathways of the communications system 100 which enables customers 101 to communicate with the intended recipients 140 of their communications. The communications system 100 can provide one or more communications services to the customers 101, including email messaging services 104, Short Messaging Service (SMS) and Multimedia Messaging Service (MMS) 106, and instant messaging (IM) services 108 (collectively referred to herein as "messaging service"). Accordingly, in some implementations, the customers 101 (e.g., individuals, companies, organizations, etc.) can have accounts within the communications system 100 which associates the customers with the functions of the respective service that enables them to send emails, SMS/MMS messages, and/or instant messages (IMs), to their recipients on a sporadic, intermitted, periodic, or continuous basis.

In some implementations, each of the email messaging service 104, SMS/MMS service 106, IM service 108, can enable a customer 101 to send large numbers (e.g., thousands, millions, etc.) of messages to their intended recipients 140 from accounts associated with each of the services respectively. Consequently, large amounts of messaging data (e.g., email data 114, SMS/MMS data 116, IM data 118, collectively referred to as "messaging data" herein) associated with the customer's accounts on each of the respective services can be collected. In some implementations, the messaging data can include data reflective of the message contents as well as of the metadata associated with the respective messages. For example, the messaging data can include the textual, graphical, and other media information included in the messages. The messaging data can also include information about the encoding of the textual data, information about the language in which the message is written, information about the topics or subject matter contained in the messages. In some instances, the metadata can include information indicating the source/origin, recipient, domains, internet addresses (e.g., internet protocol addresses), timestamps, subject, routing paths, device identifiers, telephone numbers, and other information associated with the messages, the recipients, and the customer's accounts. In some implementations, the metadata can include the number of messages sent by an account associated with a customer, the number of messages bounced by a recipient, the number of messages blocked by a recipient, and other statistical information regarding the frequency and number of successful and failed message transmissions.

In some implementations the messaging data can be stored in one or more data stores. In one implementation, the messaging data can include a random representative sampling of the data generated by the messaging service rather than all the messaging data. The messaging data can be grouped into sets of data with each set of messaging data associated with a particular customer account and a particular messaging service 104, 106, 108 of the communications system 100. While in some instances, the messages can be transmitted directly by the customers 101 to the recipients 140 through the messaging services 104, 106, 108, in other instances additional processing can be performed on the messages and the data associated with them before the messages are transmitted to the recipients 104.

In some implementations, the messaging data can be encoded such that the content (e.g., text, images) of the messages is converted into a numeric representation of the message contents (e.g., vector based semantic encoding such as word embedding, or encoding based on vector based color representations). Accordingly, the messaging data sets can include the numeric representations of the messaging data instead of the raw contents and metadata associated with each of the messages.

In some implementations, the messaging data can include Personally Identifiable Information (PII) that can include direct identifiers, such as the name, last name, email address, phone number, Social Security number, and account number etc. of the intended recipients of the messages. The PII can also include indirect identifiers such as date of birth, gender, ZIP Code, location information etc. Thus, in some implementations, the messaging data can be processed by a PII Extractor 112 that extracts and removes the PII from the messaging data. In this manner, the messaging data can be depersonalized and can have any and all associations with PII removed. Therefore, in some implementations, the messaging data sets can include depersonalized messaging data without any PII.

Since messaging data can be collected over time, representative messaging data sets can be collected and stored as a message corpus 120. The message corpus 120 can include one or more messaging data sets associated with a respective customer account for each of the messaging services 104, 106, 108, used by the customer. In some implementations, a messaging data set can include messaging data associated with known unauthorized messaging activities undertaken by one or more accounts of the communications system 100. As noted earlier, the data can be collected on a sporadic, intermittent, periodic, or continual basis and corresponding data sets can be created accordingly and stored in the message corpus 120.

In some implementations, a messaging data set can be used to train an autoencoder 122 to recognize one or more features of the messaging data. The autoencoder 122 can be a neural network configured to learn efficient representation of unlabeled messaging data by iterative attempts to regenerate input reference data sets. In some implementations, the autoencoder can be trained using one or more messaging data sets (e.g., messaging data sets stored in message corpus 120 based on messaging data collected over time) to group/classify messaging data associated with particular accounts based on similarity features. In other implementations, autoencoder can be trained using one or more messaging data sets containing messaging data representative of unauthorized messaging activities associated with one or more accounts. Consequently, the trained autoencoder's 122 level of accuracy can be used as an indicator of anomalousness or dissimilarity for a messaging data set received or created after the reference data set.

For example, the trained autoencoder's 122 accuracy in reconstructing/inferring messaging data contents correctly using a new messaging data set can be associated with a score that indicates a level of similarity between the messaging data contained in a reference messaging data set and the messaging data contained in the newly input messaging data set. In other implementations, the trained autoencoder's 122 accuracy in reconstructing/inferring messaging data contents correctly using a new messaging data set can be associated with a probability score that indicates a probability that the messaging data contained in the newly input messaging data set is a result of unauthorized or anomalous messaging activity (e.g., because it is significantly dissimilar from the messaging data contained in the reference data set). In this manner, it can be determined whether messaging activity of a particular account is likely to be authorized (e.g., when it is similar to previous messaging activity) or unauthorized (e.g., when it is dissimilar to previous messaging activity, or when it is similar to unauthorized messaging activity).

Accordingly, in some implementations, the score (e.g., similarity score, error score, probability score) associated with a given set of new messaging data can be proportionally related to the level of accuracy of the autoencoder 122 for the new messaging data set. The score determined as a result of the autoencoder processing of the new messaging data set can be transmitted to a verification component 132 of the communications system 100.

In some implementations, the verification component 132 can be pre-set with a condition or criterion relating to the score obtained from the autoencoder 122. For example, the criterion may be set so that if it is satisfied, the satisfaction of the criterion triggers a remedial action for the account associated with the new messaging data set or indicates that the newly input data merits further investigation. In some implementations, the criterion may be a pre-determined threshold value with which the score can be compared. In one implementation, the verification component 132 can be configured such that the score may need to be greater than the threshold value to satisfy the condition while in another implementation, the score may need to be less than the threshold value to satisfy the condition.

In one implementation, the score determined for newly input data sets can range from 0 to 100. Accordingly, a value of 50 can be pre-set via the verification component 132 to be the threshold such that if the score determined for the newly input set of data exceeds 50 (and thereby satisfies the threshold criterion), the satisfaction of the criterion serves as an indicator of anomalous activity and subjects the account to subsequent remedial action. In other implementations, the score can be within any suitable range of values and can be inversely proportional to the error value (e.g., accuracy level) of the autoencoder inference/reconstruction for a given data set. For example, if the score ranges between 1 and 5, the pre-set threshold value can be set at 2.5 such that the verification component 132 determines that the threshold condition is satisfied when the score determined for a given new set of messaging data is less than 2.5. Accordingly, in that case scores between 2.5 and 1 obtained by the verification component 132 from the autoencoder 122 can serve as indicators that the account associated with the new set of messaging data is a candidate for further investigation or remedial action.

Alternatively, the threshold criterion (e.g., pre-set threshold score) may be such that the satisfaction of the criterion is defined for the verification component 132 as the new data set processed by the autoencoder obtaining a score less than the threshold value. For example, if the score ranges between 1 and 100, the threshold value can be set at 60. Accordingly, if the satisfaction of the threshold criterion is defined as a score being less than 60, then a score of 45 will satisfy the criterion.

Consequently, in some implementations, after the autoencoder 122 is trained, one or more new messages associated with an account of the communications system 100 can be collected via the messaging services 104, 106, 108 and have their messaging data 114, 116, 118 (e.g., content data and metadata) encoded in a manner similar to that of the reference data set. Then, the new messaging data set can be processed by the autoencoder 122, and a score can be generated based on the accuracy of the autoencoder reconstruction/inference. Accordingly, the score can be passed to the verification component 132 and if the resulting score satisfies a threshold criterion, the account associated with the new messages can be flagged or otherwise marked for further investigation or remedial action. In some implementations the subsequent remedial action can be performed automatically via verification component 132 of the communications system 100. For example, the messaging service 104, 106, 108 of the account can have one or more of its features and functions stopped or blocked by the verification component 132. In some implementations, the verification component 132 can alter the frequency with which the account is permitted to send messages through the communication system 100 to recipients 140 (e.g., the account can be throttled). In other implementations, the account associated with the message set can be marked with an indicator so that further review of the messages associated with the account can be performed. The methods for account verification and autoencoder operation are described in more detail below with reference to FIG. 3 and FIG. 4, respectively.

Figure 2:
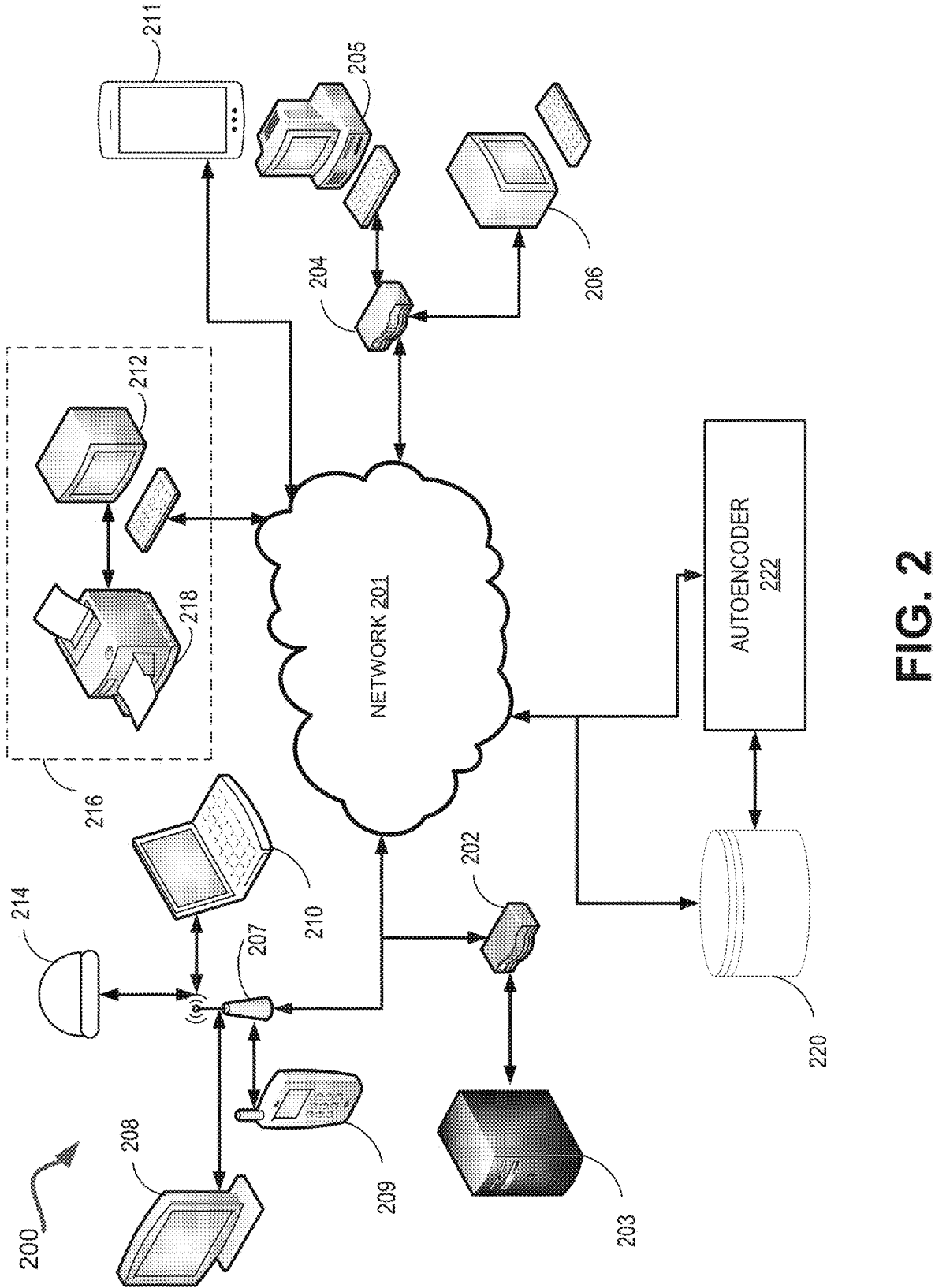
FIG. 2 is a schematic diagram of an example system architecture, in accordance with an implementation of the present disclosure.

FIG. 2 illustrates a schematic overview of a system architecture 200 within which communications system 100 of FIG. 1 can operate and through which the elements and functions of communications system 100 can be implemented. In some implementations, the system architecture 200 can include one or more application servers 203 for electronically storing information used by the system (e.g., customer account data, messaging data). Applications in the server 203 can retrieve and manipulate information in storage devices and exchange information through a network 201 (e.g., the internet, a wide area network (WAN), a local area network (LAN), etc.). Applications in server 203 can also be used to manipulate information stored remotely and process and analyze data stored remotely across the network 201. For example, in some implementations, the applications in the server 203 can include the PII extractor 112 of FIG. 1 and can excise PII from messaging data that can be stored on data store 220 that can also be connected to network 201.

In the depicted implementation of FIG. 2, the exchange of information through the network 201 or other network can occur through one or more high speed connections. In some cases, high speed connections can be over-the-air (OTA), passed through networked systems, directly connected to one or more networks 201 or directed through one or more routers 202. Router(s) 202 can be included in some implementations of the present disclosure while other implementations may not utilize one or more routers 202. It is noted that there are numerous ways server 203 can connect to network 201 for the exchange of information, and various implementations of the invention are contemplated for use with any method for connecting to networks for the purpose of exchanging information. Further, while this application refers to high speed connections, implementations of the invention can be utilized with connections of any speed.

Components, elements, or modules of the system architecture 200 (which can correspond to one or more components, elements, or modules of system 100) can connect to server 203 via network 201 or other network in various ways. For instance, a component or module can connect to the system (i) through a computing device 212 directly connected to the network 201, (ii) through a computing device 205, 206 connected to the network 201 through a routing device 204, (iii) through a computing device 208, 209, 210, 214 connected to a wireless access point 207, or (iv) through a computing device 211 via a wireless connection (e.g., WiFi, CDMA, GMS, 3G, 4G, 5G, etc.) to the network 201. There are numerous ways that a component or module can connect to server 203 via network 201 or other network, and implementations of the invention are contemplated for use with any method for connecting to server 203 via network 201 or other network. Furthermore, server 203 could be comprised of a personal computing device, such as a smartphone 209, acting as a host for other computing devices to connect to.

In some implementations, customers 220 of the system can interact with the components of the system via computing devices such as a laptop 210, personal computers 205, 206, 208, cellular phones/smart phones 209, tablets 211, smart speakers 214 etc. Each of the abovementioned functions of the components of communications system 100 can be performed via the input and output means of these respective devices including the collection of generation and collection of messaging data, the generation and storage of messaging data sets, the removal of PII, training the autoencoder 222, processing of data with the autoencoder 222, verifying accounts based on new messaging data sets and scores obtained from the autoencoder 222.

For example, in one implementation, a customer can operate a laptop 210 to access one or more messaging services through an account associated with the customer to send messages to recipients. The data generated by the messaging activities can be stored in data store 220 which can, for example, include a random representative sample of PII-free messaging data associated with an account's messaging activities conducted over a predetermined period of time. The system can use the messaging data stored in data store 220 to train autoencoder 222 to recognize the features of the messaging data representative of the messages sent by the customer during that period of time (e.g., a reference data set).

Thereafter, new messaging data (e.g., a new data set) can be obtained from the messaging activities associated with the customer account and processed by the trained autoencoder to obtain a score associated with the accuracy of the autoencoder reconstruction of the new messaging data (e.g., a score indicative of similarity between the reference data set and the new data set; a probability score of the new data set resulting from anomalous or unauthorized messaging activity). In some implementations, depending on whether the score satisfies a predetermined criterion (e.g., is greater than/less than a predetermined threshold value), the customer's account can be marked for automatic remedial actions to be taken or for further investigation to be conducted. For example, if the score is greater than a threshold value, the customer's account can be prevented from sending any more messages.

In other implementations, messaging data generated by unauthorized messaging activities can be stored in data store 220 and can include only message content data or only message metadata. Accordingly, a customer can use the messaging data stored in data store 220 to train autoencoder 222 to recognize the features of the messaging data representative of the unauthorized messaging activities. Conversely to the case where messaging data is obtained from a customer account's activity over a period of time, if the messaging data is obtained using known unauthorized messaging activity, the score obtained after the autoencoder processes the new data set can have the opposite significance (e.g., since the score indicative of similarity between the reference data set and the new data set, a probability score of the new data set resulting from anomalous or unauthorized messaging activity will be high if the new data set is similar to the reference data set obtained using messaging data associated with unauthorized messaging activity).

While some implementations can target processing entire sets of new message data, other implementations can be directed to determinations made for individual messages. For example, in some implementations, server 203 can receive, from one of the other computing device 208, 209, 210, 214, an electronic message originated by a customer account for transmission to a recipient. With the autoencoder 222 being trained (e.g., at an earlier time) on multiple messages originated by the customer account, it can be used to determine an encoded representation of the electronic message. In some implementations this can be accomplished by inputting a numeric representation of the electronic message into the autoencoder 222 to obtain the encoded representation of the electronic message. Notably, the autoencoder can be trained using both message contents and message metadata.

Further, a measure of similarity or dissimilarity between the electronic message and the previous message can be obtained. For example, using the encoded representations from the autoencoder 222, the server 203 can determine a value reflecting a difference between the encoded representation of the electronic message and encoded representations of the previous messages originated by the customer account. In some cases, the encoded representations of each message originated by the customer account can include a numeric vector encoding of one or more words or character stings in the message. In other cases, the encoded representations of each message can also include a numeric vector encoding of one or more words or character stings in the message metadata.

To determine the value reflecting the difference between the encoded representation of the electronic message and encoded representations of the previous messages, the server 203 can determine a distance, in vector space, between the encoded representation of the electronic message and a centroid of a nearest cluster of encoded representations of each message of the previous messages originated by the customer account. In some implementations, the value can be a fraction of or a constant multiple of the determined distance.

The value reflecting the difference between the aforementioned representations can then be used to check whether a predefined condition is satisfied to decide whether or not to forward the electronic message to the recipient specified by the electronic message. In some examples, the predefined condition can be the determined value being greater than a predefined threshold value (e.g., difference measure value<threshold value) while in other examples the predefined condition can be the determined value being less than the predefined threshold value (e.g., difference measure value>threshold value). If the condition is satisfied (e.g., if the determined value is less than the threshold value, the server 203 can forward the electronic message to the recipient specified by the electronic message. In other implementations an aggregate measure can be determined for multiple new electronic messages (e.g., a set of randomly selected new messages received over a period of time) based on a percentage of the new electronic messages having determined values that satisfy the criteria. If this aggregate measure satisfies another predetermined condition, the server 203 can perform a remedial operation with respect to the customer account as described herein.

In some implementations, the server 203 can receive, from one of the other computing device 208, 209, 210, 214, a collection of multiple electronic messages originated by a customer account. This can include messages that were sent by the customer account over a period of time in the past. The server 203 can also store the received electronic messages originated by the customer account in a message corpus on a data store 220, and remove personally identifiable information from the electronic messages originated by the customer account. The server 203 can, in some implementations, cluster the respective encoded representation of each message in vector space to generate one or more clusters of encoded representations of the messages where each cluster can correspond to a set of messages sharing a similar characteristic (e.g., be part of the same mailing campaign, share the same language, topic, context etc.).

These messages can be used to train the autoencoder 222 by processing the past messages originated by the customer account. As described in more detail with reference to FIG. 6 the autoencoder 222 can be represented by a neural network comprising an encoding sub-network (e.g., encoder stage) and a decoding sub-network (e.g., decoder stage), such that an intermediate representation of each electronic message of the received electronic messages is input into the encoding sub-network and an output of the encoding sub-network is input into the decoding sub-network. The autoencoder can be trained to minimize a difference between an input of the encoding sub-network and an output of the decoding sub-network by being incentivized to accurately reproduce (e.g., at the output of the decoding sub-network) the most frequently occurring characteristics of the reference data of the encoded messages (e.g., provided as input into the encoding sub-network).

Further, a measure of similarity or dissimilarity between a new electronic message and the previous message can be determined. This measure can be a value reflecting a difference between an encoded representation of the new electronic message and encoded representations of the received messages originated by the customer account. In some implementations, the encoded representations of each of the electronic messages originated by the customer account can include numeric vector encoding of one or more words or character strings in the message (e.g., message contents) as well as numeric vector encoding of one or more words or character strings in the metadata associated with the message (e.g., message metadata). The determination can be made by applying the trained autoencoder 222 to the new electronic message originated by the customer account and determining a distance in vector space between the encoded representation of the new electronic message and a centroid of a nearest cluster of the encoded representations of the received messages.

The communications means of the depicted system architecture 200, according to implementations of the present invention, can be any means for communicating data, including image and video, over one or more networks or to one or more peripheral devices attached to the system, or to a system module or component. Appropriate communications means can include, wireless connections, wired connections, cellular connections, data port connections, Bluetooth© connections, and any combination thereof. There are numerous communications means that can be utilized with the various implementations of the invention, and implementations of the invention are contemplated for use with any communications means.

In implementations of the present disclosure, computer programs or applications, such as those executed by server 203, can each include a finite sequence of computational instructions or program instructions. A programmable apparatus or computing device 208, 209, 210, 214, of the various implementations, can host such a computer program and, by processing the computational instructions thereof, produce a technical effect. Accordingly such a programmable apparatus or computing device 208, 209, 210, 214 can include one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this specification and elsewhere, a computing device can include any and all suitable combinations of at least one general purpose computer, special-purpose computer, programmable data processing apparatus, processor, processor architecture, etc. In the implementations described herein, a computing device can include a computer-readable storage medium and that this medium can be internal or external, removable and replaceable, or fixed. It will also be understood that a computing device can include a Basic Input/Output System (BIOS), firmware, an operating system, a database, or the like that can include, interface with, or support the software and hardware described herein.

A data store 220 can include one or more of a database, file storage system, relational data storage system or any other data system or structure configured to store data. The data store may be a relational database, working in conjunction with a relational database management system (RDBMS) for receiving, processing and storing data. A data store may comprise one or more databases for storing information related to the processing of moving information and estimate information as well one or more databases configured for storage and retrieval of moving information and estimate information.

Computer readable program instructions described herein can be downloaded to respective computing/processing devices from a computer readable storage medium or to an external computing device or external storage device via a network 201, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The flowchart and block diagrams in the Figures illustrate the architecture, functionality, and operation of possible implementations of systems, methods, and computer program products according to the various implementations hereof. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures.

Figure 3:
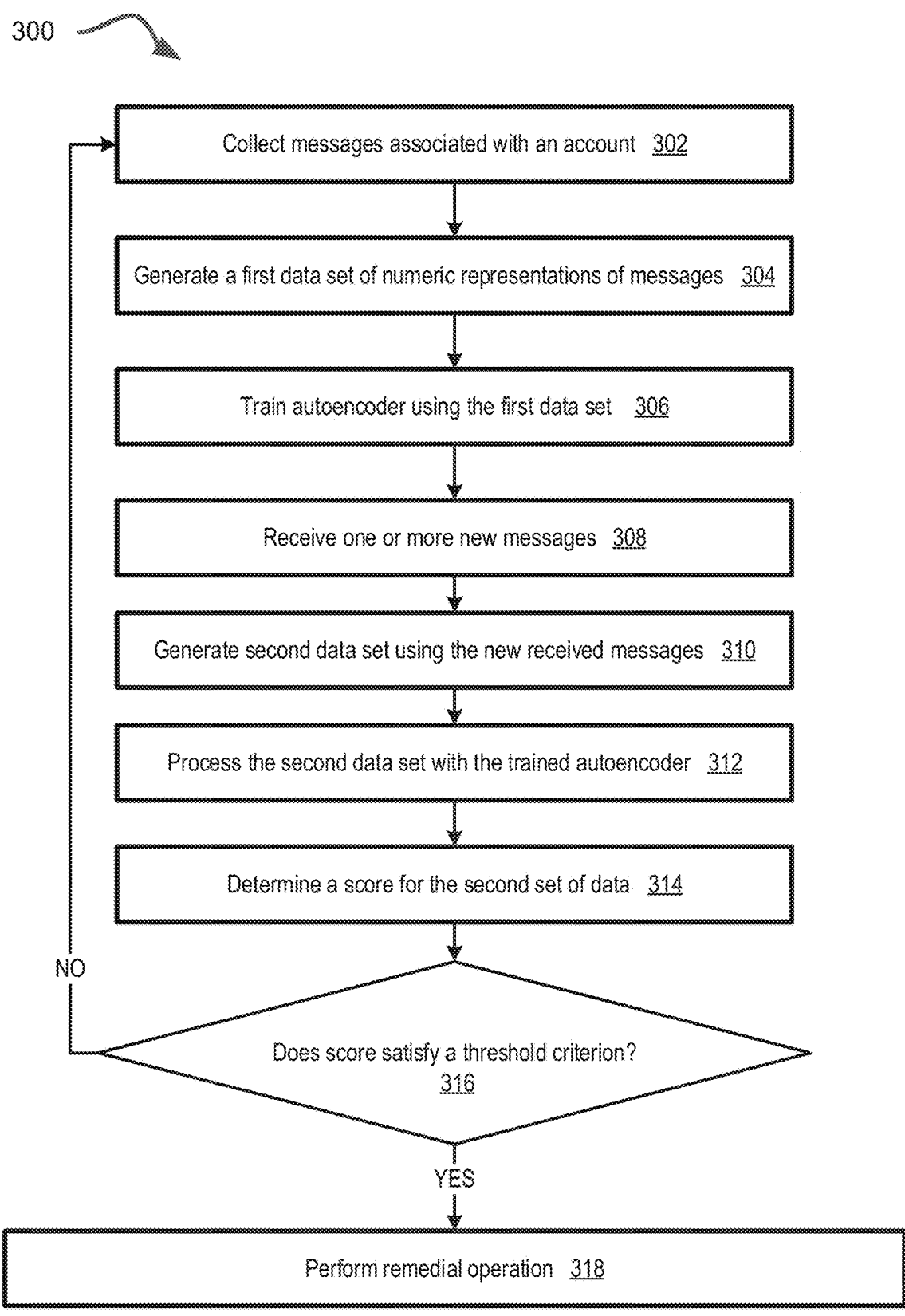
FIG. 3 is a diagram of an example method for account verification and remediation, in accordance with some implementations of the present disclosure.

One such flowchart illustrating a method for account verification in accordance with an implementation of the present disclosure is shown in FIG. 3 while another flowchart illustrating a method for autoencoder training is shown in FIG. 4 and additional flowcharts are depicted in FIGS. 5A-5B. FIGS. 3-4 and 5A-5B illustrate methods 300, 400, and 500 respectively. Methods 300, 400, and 500 and/or each of the aforementioned methods' individual functions, routines, subroutines, or operations can be performed by a processing device, having one or more processing units (CPU) and memory devices communicatively coupled to the CPU(s). In some implementations, the aforementioned methods can be performed by a single processing thread or alternatively by two or more processing threads, each thread executing one or more individual functions, routines, subroutines, or operations of the method. The aforementioned methods as described below can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some implementations, methods 300, 400, and 500 are performed by verification component 132 described in FIG. 1. Although shown in a particular sequence or order, unless otherwise specified, the order of the operations can be modified. Thus, the illustrated implementations should be understood only as examples, and it should be understood that the illustrated operations can be performed in a different order, while some operations can be performed in parallel. Additionally, one or more operations can be omitted in some implementations. Thus, not all illustrated operations are required in every implementations, and other process flows are possible. In some implementations, the same, different, fewer, or greater operations can be performed.

Accordingly, FIG. 3 depicts a method 300 for account verification in accordance with some implementations of the present disclosure. In the depicted implementation, the processing logic can, at block 302, collect one or more messages associated with an account of a messaging system. At block 304, the processing logic can generate a set of data (e.g., a reference set of messaging data, a new set of messaging data) including numeric representations (e.g., word embeddings, vector encodings, etc.) of the messaging data of each message of the collected messages.

In some implementations, the processing logic can, at block 306, train an autoencoder using the reference set of data. Consequently, after the autoencoder is trained, the processing logic can, at block 308, collect or receive one or more messages (e.g., new messages not included in previous data sets). Thus at block 310, the processing logic can, generate another set of data including the messaging data of the one or more new messages received or obtained at block 308. Notably, in some implementations, the messages and the generated data sets (e.g., reference data set, new data set) can include both message content data and message metadata. In other implementations, the generated data sets (e.g., reference data set, new data set) can include exclusively either the message content data or the message metadata.

In some implementations, at block 312, the processing logic can input the new data set into the autoencoder and process the new data set with the trained autoencoder. At block 312, the processing logic can determine a level of accuracy of the autoencoder processing for the new data set (e.g. by determining a distance, in vector space, between the centroid of a cluster of numerical representations comprising the new data set and a centroid of a nearest cluster of numerical representations comprising reference set of data). Based on the level of accuracy, the processing logic can, at block 314, determine a score for the new data set (e.g., the score can be a fraction or a constant multiple of an aggregate measure of autoencoder accuracy associated with one or more messages included in the new data set). In some implementations, the processing logic can associate the autoencoder's level of accuracy for the new data set with a score that indicates a level of similarity between the messaging data contained in the reference data set and data contained in the new data set. Accordingly, depending on whether the reference data set is representative of usual authorized messaging activity associated with the account or is representative of unauthorized messaging activity, a corresponding inference can be made based on the determined similarity. In other implementations, the processing logic can associate the autoencoder's level of accuracy for the new data set with a probability score that indicates a probability that the messaging data contained in the new data set is a result of unauthorized or anomalous messaging activity (e.g., because it is significantly dissimilar from the messaging data contained in the reference data set associated with regular messaging activity associated with the account, or because it is significantly similar to messaging data contained in the reference data set associated with unauthorized messaging activity).

Accordingly, at block 316, the processing logic can determine whether the score obtained for the new data set satisfies a threshold criterion or threshold condition. In some implementations, the threshold criterion can be whether or not a score exceeds a pre-set threshold score value. In other implementations, the threshold criterion can be whether or not a score is less than a pre-set threshold score value. In some implementations, the score can be proportionally related to the autoencoder's accuracy for a particular data set. Thus, if at block 316, the processing logic determines that the score obtained using the new data set satisfies the threshold criterion, the processing logic can, at block 318, perform a remedial operation. In some implementations, the remedial operation performed by the processing logic at block 318 can entail the execution of an action that can include one or more of, marking the account associated with the new data set for further investigation, modifying the frequency with which the account associated with the new data set is permitted to send messages, blocking the account associated with the new data set from sending messages, sending a notification to another customer, or any combination of the foregoing. However, if at block 316, the processing logic determines that the score obtained using the new data set does not satisfy the threshold criterion, the processing logic can return to block 302 and continue collecting messages associated with the account.

Some of the operations included in blocks 304, 306, 310, and 314 of methods 300 are explained in more detail with reference to FIG. 4, which depicts an example method 400 for autoencoder training and scoring, in accordance with some implementations of the present disclosure. Accordingly, in some implementations, the processing logic can, at block 402 store a set of data in a message corpus. The set of data can be a reference set of data such as the one generated at block 304 or a new set of data such as the one generated at block 310. In some implementations, the set of data can include messaging data, which itself can include message contents data, message metadata, or a combination of both. In some implementations, the processing logic can, at block 404, remove PII from a set of data (e.g., using PII extractor 112). In this manner, sets of messaging data that can be used as reference data sets and sets of messaging data that can be used as new data sets can be generated by the processing logic.

In some implementations, the processing logic can, at block 406, train the autoencoder (e.g. analogously to the operations at block 306 of method 300) using one or more data sets (i.e., reference data sets of messaging data). The messaging data can contain message content data, message metadata, or both. To train the autoencoder at block 406, the processing can, at block 407, create numeric representations of the information (messaging data) included in each message of the data set, and cluster, at block 408, the representations of the information (messaging data) included in each message in vector space. In some implementations, the processing logic creating numeric representations of the messaging data of each message at block 407 can include converting the textual and/or graphical data included in the message contents and in the metadata into multivariable numerical vector representations thereof (e.g., via word embedding, or via color gradient encoding, respectively). Accordingly, in these implementations, the numeric representations of each message can include a vector encoding of one or more words in a corresponding message. In other implementations, the processing logic can, at block 407, convert each message to plain text (e.g., remove any hypertext markup language (HTML) or other formatting) before creating numeric representations of the messaging data.

In some implementations, during training of the autoencoder, at block 408, the numeric representation of the messaging data of each message are caused to be clustered in vector space, which can involve clustering data points respectively representative of the messaging data in multidimensional vector space where each dimension corresponds to a feature of the messaging data and where a coordinate of the data point correspond to a numerical value associated with the feature for a particular message. The clustering can further include the determination of the respective centroids of each of the clusters associated with each respective messaging data set.

In some implementations, the processing logic can process a new data set (e.g., by using the trained autoencoder) to determine, at block 409 a score for the new data set. As noted above, in some implementations, the score can correspond to a measure of similarity between the messaging data of the new data set and the messaging data of a reference data set, while in other implementations, it can correspond to a measure of likelihood that the messaging data of the new data set is a result of unauthorized or anomalous message activity (e.g., due to significantly deviating in some measurable features from the messaging data in the reference data set(s) associated with regular messaging activities associated with a customer account, or due to having significant similarity/congruence in some measurable features from the messaging data in the reference data set(s) associated with unauthorized messaging activity). In some implementations, the processing logic can, at block 409 determine the score to be proportional to the accuracy level of the trained autoencoder's inference for the new data set. In other implementations, the processing logic can, at block 409 determine the score to be proportional to the distance between the centroids of two clusters of data points where the distance can be defined as the L2 norm (e.g., Euclidian distance in vector space) or any other suitable metric.

Accordingly, the distance between the centroid of a cluster of data points of a reference data set and the centroid of a cluster of data points of a new data set can be determined. Thus, in some implementations determining, by the processing logic at block 409, the score for the new set of data can include determining a distance in vector space between a centroid of a cluster of values encoding the messaging data of the messages in the reference set of data and the centroid of a cluster of values encoding the messaging data of the messages in the new set of data. The processing logic can then compare, at block 409 the score based on the determined distance to a pre-set threshold value of the score to determine whether the score satisfies a threshold criterion. In this manner, based on whether or not the resulting score satisfies the threshold criterion, the processing logic can determine whether the account with which the new data set is associated should be subjected to remedial actions (e.g., marking, blocking, throttling, etc.). In some cases, different criteria (e.g., threshold values) can be defined such that the satisfaction of each criterion can correspond to a particular remedial action. In some implementations, the processing logic can then proceed to undertake the remedial action associated with the corresponding score obtained for the new data set. Accordingly the processing logic can, based on the obtained score, execute an operation including marking the account associated with the new data set for further investigation, modifying the frequency with which the account associated with the new data set is permitted to send messages, blocking the account associated with the new data set from sending messages, sending a notification to another user, or any combination of the foregoing. These and other features of the method can be further understood with reference to the autoencoder depicted in FIG. 6.

Some implementations can have further include other methods for message filtering as well as autoencoder training and application which are described in more detail with reference to FIGS. 5A-5B. FIG. 5A is a diagram of an example method for message while FIG. 5B is a diagram of an example method for autoencoder training and application, in accordance with some implementations of the present disclosure.

In some implementations, the processing logic can, at block 502, receive an electronic message originated by a customer account for transmission to a recipient. With the autoencoder 222 being trained (e.g., at an earlier time) on multiple messages originated by the customer account, the processing logic can, at block 504, determine an encoded representation of the electronic message. In some implementations, the processing logic can determine the encoded representation by inputting a numeric representation of the electronic message to the autoencoder.

Further, a measure of similarity or dissimilarity between the electronic message and the previous message can be obtained. For example, using the encoded representations the processing logic can, at block 506, determine a value reflecting a difference between the encoded representation of the electronic message and encoded representations of the previous messages originated by the customer account. In some cases, the encoded representations of each message originated by the customer account can include a numeric vector encoding of one or more words or character stings in the message. In other cases, the encoded representations of each message can also include a numeric vector encoding of one or more words or character stings in the message metadata.

To determine the value reflecting the difference between the encoded representation of the electronic message and encoded representations of the previous messages, the processing logic can determine, at block 506, a distance, in vector space, between the encoded representation of the electronic message and a centroid of a nearest cluster of encoded representations of each message of the previous messages originated by the customer account. In some implementations, the processing logic can determine the value to be a fraction of or a constant multiple of the determined distance.

The value reflecting the difference between the aforementioned representations can then be used by the processing logic, at block 507, to check and determine whether a predefined condition is satisfied to decide whether or not to forward the electronic message to the recipient specified by the electronic message. In some examples, the predefined condition can be the determined value being greater than a predefined threshold value (e.g., difference measure value<threshold value) while in other examples the predefined condition can be the determined value being less than the predefined threshold value (e.g., difference measure value>threshold value). If the condition is satisfied (e.g., if the determined value is less than the threshold value), the processing logic, at block 509, can forward the electronic message to the recipient specified by the electronic message. In other implementations, the processing logic can determine an aggregate measure for multiple new electronic messages (e.g., a set of randomly selected new messages received over a period of time) based on a percentage of the new electronic messages having determined values that satisfy the criteria. If this aggregate measure satisfies another predetermined condition, the processing logic can perform a remedial operation with respect to the customer account as described herein.

In some implementations, the processing logic, at block 512, can receive a collection of multiple electronic messages originated by a customer account. This can include messages that were sent by the customer account over a particular period of time in the past. At block 512, the processing logic can also store the received electronic messages originated by the customer account in a message corpus on a data store and remove personally identifiable information from the electronic messages originated by the customer account.

The processing logic can then, at block 514, use the messages to train the autoencoder by processing the past messages originated by the customer account. The processing logic can, at block 514, cause an intermediate representation of each electronic message of the received electronic messages to be input into the encoding sub-network of the autoencoder and cause an output of the encoding sub-network to be input into the decoding sub-network of the autoencoder. Thereby, the processing logic can train, at block 514, the autoencoder to minimize the difference between an input of the encoding sub-network and an output of the decoding sub-network by incentivizing it to accurately reproduce (e.g., at the output of the decoding sub-network) the most frequently occurring characteristics of the reference data of the encoded messages (e.g., provided as input into the encoding sub-network).

Further, the processing logic can, at block 516, determine a measure of similarity or dissimilarity between a new electronic message and the previous message. This measure can be a value reflecting a difference between an encoded representation of the new electronic message and encoded representations of the received messages originated by the customer account. In some implementations, the encoded representations of each of the electronic messages originated by the customer account can include numeric vector encoding of one or more words or character strings in the message (e.g., message contents) as well as numeric vector encoding of one or more words or character strings in the metadata associated with the message (e.g., message metadata). The processing logic can, at block 516, determine the value reflecting that difference by applying the trained autoencoder to the new electronic message originated by the customer account and by determining a distance in vector space between the encoded representation of the new electronic message and a centroid of a nearest cluster of the encoded representations of the received messages.

Figure 6:
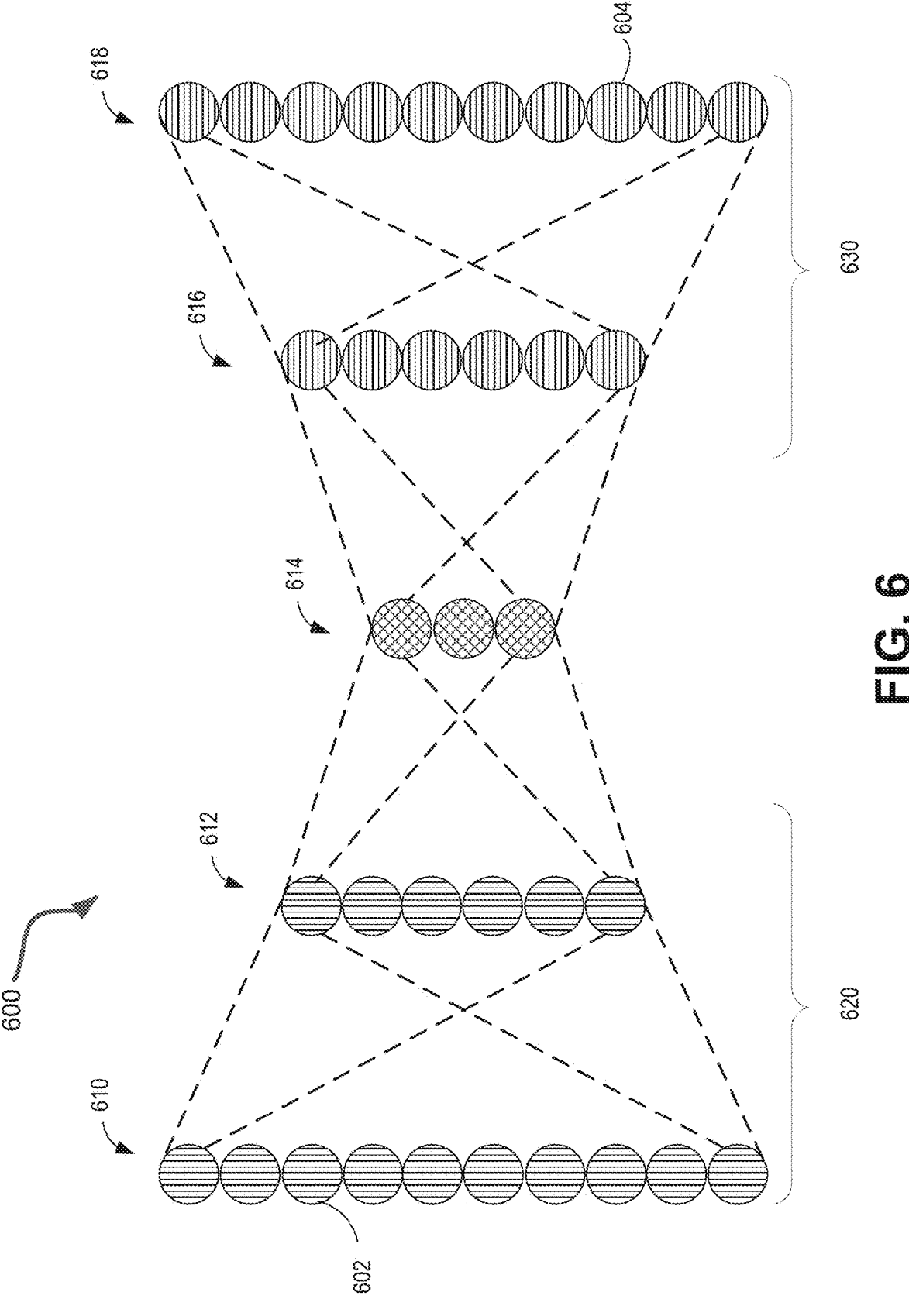
FIG. 6 is a schematic illustration of an example autoencoder, in accordance with some implementations of the present disclosure.

FIG. 6 illustrates an example autoencoder, in accordance with some implementations of the present disclosure. In the depicted implementations, the autoencoder 600 can be a multilayer neural network including an input layer 610, hidden layers 612, 614, 616, and output layer 618. Each of the layers can include one or more neurons. For example, the input layer 610 can include one or more neurons 602, each of which can be connected to one or more neurons of the hidden layer 612. Similarly, each of the neurons of each subsequent hidden layer (e.g., layers 612 and 614) can, in turn, be connected to one or more neurons of a following hidden layer (e.g., layers 614 and 616), respectively, or to one or more neurons of output layer 618. In the implementations disclosed herein, the autoencoder can be a neural network in which the dimensions of the input and output vectors are equal, while the dimension of the one or more hidden intermediate layers is significantly less than that of the input and output layers. Such an autoencoder can be used for unsupervised learning of encodings of sets of data (e.g., messaging data sets).

In some implementations, the autoencoder 600 can include an encoder stage 620 and a decoder stage 630. The encoder stage 620 of the autoencoder 600 can receive input data (e.g., encoded vector representations of the messaging data included in a reference or new data set) and map it to a latent/intermediate representation(s) with significantly reduced dimensionality in hidden layer 614. The decoder stage 630 of the autoencoder 600 can map the latent representation from the hidden layer 614, to a reconstruction output data (e.g., a reconstructed vector representation of the data having the same dimension as the input data). Accordingly, in some implementations, the autoencoder 600 can be trained, as described above, using one or more reference data sets to minimize the reconstruction error. Since the dimensionality of the one or more hidden layers is significantly less than that of the input and output layers, in some implementations, the autoencoder can compress the input data from the input layer and can then restore it via output layer, thereby detecting certain inherent or hidden features of the input data set without needing labeled data to be provided for training.

Accordingly, in some implementations, the autoencoder 600 can be represented by a feed-forward, non-recurrent neural network that can be trained, by an unsupervised learning process, to reconstruct its own inputs. Thus, the autoencoder 600 can receive inputs in the form of messaging data (e.g., encoded numeric vector representations of messages) from the reference messaging data sets for training so that it can, based on the numeric representations of the messages (e.g., encodings of the message content data and message metadata), be trained to learn to accurately reconstruct the messaging data (e.g., reconstructed encoded numeric vector representations of messages). In some implementations, the autoencoder 600 output can be used to cluster the messages of each of the reference messaging data sets based on their reconstructed vector representations in multidimensional vector space where each vector corresponds to a value of a feature of the messaging data.

Subsequently, the trained autoencoder 500 can receive the messaging data of a new data set for processing. The accuracy of the reconstruction in output layer 518 of the messaging data entered into input in layer 510 can be measured. Accordingly, a measure of the error rate of the reconstruction can be determined for each message of the new data set or for the data set collectively. In some implementations, the autoencoder 500 output can be used to cluster the messages of each of the new messaging data sets based on their reconstructed vector representations in multidimensional vector space. Using the clustering provided by the autoencoder for the reference and new data sets, respectively, the implementations of the present disclosure can determine the distance between the centroid of the cluster of data points of the new data set and the centroid of the cluster of data points (i.e., vector representations of the messaging data) to generate a score for the new data set. As noted earlier, in other implementations, the score can be proportionally related to the accuracy of the reconstruction of the input data of the new data set (e.g., can be proportional to the autoencoder's reconstruction error.) Thus, based on the results of the processing of new messaging data by the autoencoder 500, a score for the new data set can be obtained and used for determining whether a remedial action is to be taken with respect to the account associated with the new data set and for taking the relevant remedial action as described earlier. The autoencoder 500, as well as the components of system 100 and system architecture 200 can, in some implementations of the present disclosure be embodied by one or more components of computer system 700 shown in FIG. 7.

Figure 7:
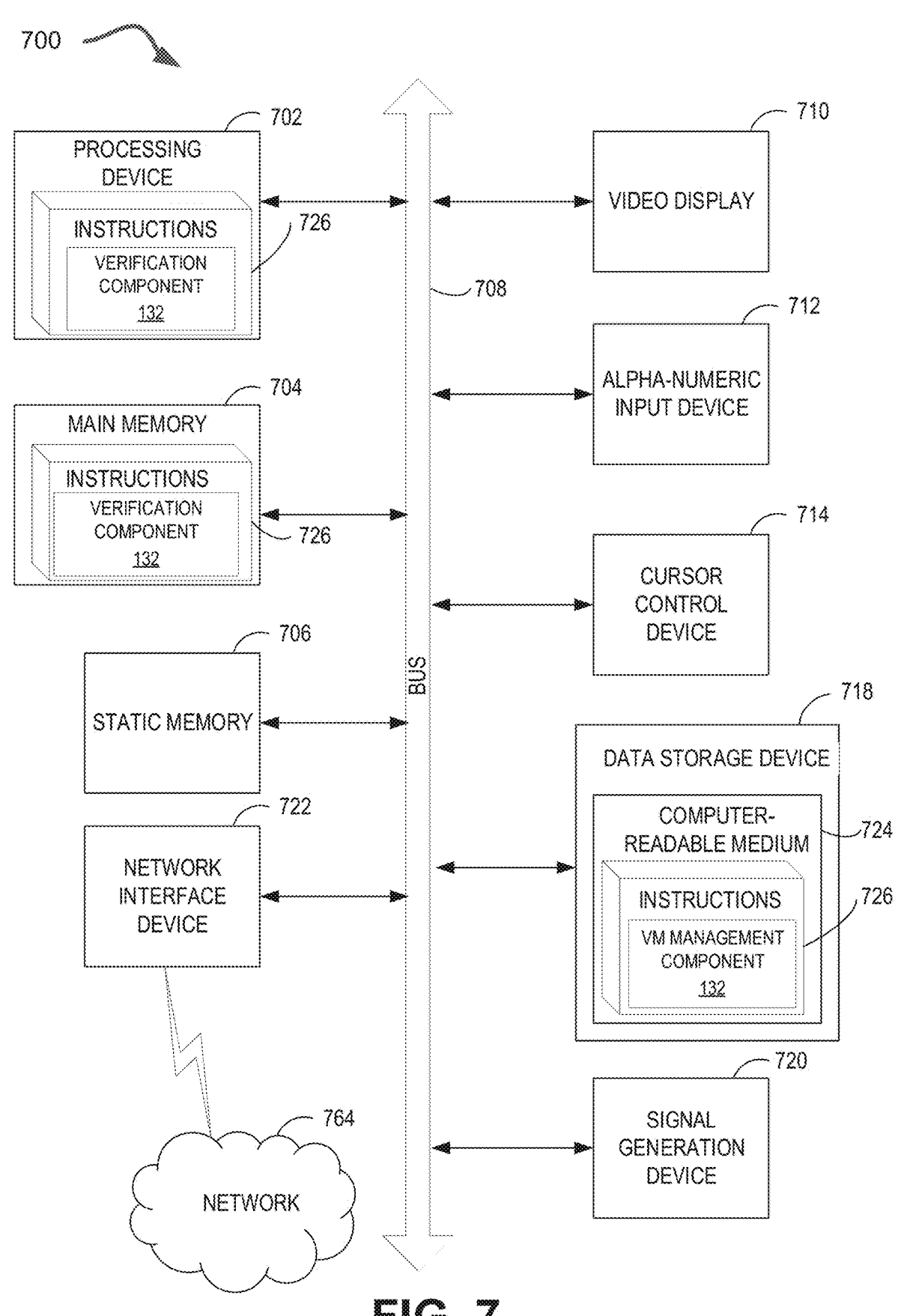
FIG. 7 is a block diagram of an illustrative computing device, in accordance with some implementations of the present disclosure.

FIG. 7 depicts an example computer system 700 which can perform any one or more of the methods described herein (e.g., methods 300, 400). The computer system can be connected (e.g., networked) to other computer systems in a LAN, an intranet, an extranet, or the Internet. The computer system can operate in the capacity of a server in a client-server network environment. The computer system can be a personal computer (PC), a tablet computer, a set-top box (STB), a Personal Digital Assistant (PDA), a mobile phone, a camera, a video camera, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The example computer system 700 includes a processing device 702, a main memory 704 (e.g., read-only memory (ROM), flash memory, dynamic random access memory (DRAM) such as synchronous DRAM (SDRAM)), a static memory 706 (e.g., flash memory, static random access memory (SRAM)), and a data storage device 718, which communicate with each other via a bus 708.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 726 for implementing the components of the implementations of the present disclosure, such as the PII extractor 112, message corpus 120, autoencoder 122, and verification component 132 of FIG. 1, server 203, data store 220, autoencoder 222, and/or the computing devices of FIG. 2 and to perform the operations discussed herein (e.g., operations of methods 300 and 400 respectively of FIGS. 3 and 4).

The computer system 700 can further include a network interface device 722. The computer system 700 also can include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 720 (e.g., a speaker). In one illustrative example, the video display unit 710, the alphanumeric input device 712, and the cursor control device 714 can be combined into a single component or device (e.g., an LCD touch screen).

The data storage device 716 can include a computer-readable medium 724 on which are stored the instructions 726 embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting computer-readable media. In some implementations, the instructions 726 can further be transmitted or received over a network via the network interface device 722.

While the computer-readable storage medium 724 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding, or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media, as well as electronic, magnetic, optical, electromagnetic, infrared, or semiconductor system, apparatus, or device, or any suitable combination of the foregoing. Any combination of one or more computer readable medium(s) can be utilized with the various implementations of the invention.

A "computer readable medium" as used herein can be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Although the operations of the methods herein are shown and described in a particular order, the order of the operations of each method can be altered so that certain operations can be performed in an inverse order or so that certain operation can be performed, at least in part, concurrently with other operations. In certain implementations, instructions or sub-operations of distinct operations can be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the aspects of the present disclosure can be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "selecting," "storing," "analyzing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus can be specially constructed for the required purposes, or it can comprise a general purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct more specialized apparatus to perform the required method steps. The required structure for a variety of these systems will appear as set forth in the description. In addition, aspects of the present disclosure are not described with reference to any particular programming language. It will be appreciated that a variety of programming languages can be used to implement the teachings of the present disclosure as described herein.

Aspects of the present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read-only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Furthermore, the terms "first," "second," "third," "fourth," etc. as used herein are meant as labels to distinguish among different elements and may not necessarily have an ordinal meaning according to their numerical designation.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

What is claimed is:

1. A method, comprising:
receiving, by a processing device, an electronic message for transmission to a recipient, wherein the electronic message is originated by a customer account;
determining, by inputting a numeric representation of the electronic message into an autoencoder, an encoded representation of the electronic message, wherein the autoencoder is trained on a plurality of messages originated by the customer account, wherein the autoencoder is trained to minimize a difference between an input of an encoding sub-network of the autoencoder and an output generated by a decoding sub-network of the autoencoder based on an output of the encoding sub-network when processing messages associated with the customer account;
determining a value reflecting a difference between the encoded representation of the electronic message produced by the encoding sub-network and encoded representations of the plurality of messages originated by the customer account produced by the encoding sub-network; and
responsive to determining that the value reflecting the difference satisfies a predefined condition, transmitting the electronic message to the recipient specified by the electronic message, wherein the predefined condition is based on a threshold value indicating an anomaly in a new electronic message compared to the plurality of messages originated by the customer account.

2. The method of claim 1, wherein the predefined condition is satisfied when the value reflecting the difference is less than a predefined threshold value.

3. The method of claim 1, wherein the encoded representations of each message of the plurality of messages originated by the customer account comprise a numeric vector encoding of one or more words in a corresponding message of the plurality of messages.

4. The method of claim 1, wherein the encoded representations of each message of the plurality of messages originated by the customer account comprise a numeric vector encoding of metadata associated with each message of the plurality of messages in vector space.

5. The method of claim 1, wherein determining the value reflecting a difference comprises determining a distance in vector space between the encoded representation of the electronic message and a centroid of a nearest cluster of encoded representations of each message of the plurality of messages.

6. The method of claim 5, wherein the value is proportional to the distance.

7. The method of claim 1, wherein the electronic message and each message of the plurality of messages comprise metadata and wherein the autoencoder is trained using both message contents and message metadata.

8. A method comprising:
receiving, by a processing device, a plurality of electronic messages originated by a customer account;
training an autoencoder by processing the plurality of electronic messages originated by the customer account, wherein the autoencoder is represented by a neural network comprising an encoding sub-network and a decoding sub-network, such that an intermediate representation of each electronic message of the plurality of electronic messages is input into the encoding sub-network, an output of the encoding sub-network is input into the decoding sub-network, and the autoencoder is trained to minimize a difference between an input of the encoding sub-network and an output of the decoding sub-network when processing messages associated with the customer account; and
determining, by applying the autoencoder to a new electronic message originated by the customer account, that a value reflecting a difference between an encoded representation of the new electronic message and encoded representations of the plurality of electronic messages originated by the customer account does not satisfy a threshold value, wherein the threshold value indicates an anomaly in the new electronic message compared to the plurality of electronic messages originated by the customer account.

9. The method of claim 8, further comprising:
storing the plurality of electronic messages originated by the customer account as a message corpus; and
removing personally identifiable information from the plurality of electronic messages originated by the customer account prior to training the autoencoder.

10. The method of claim 8, wherein the encoded representations of each message of the plurality of electronic messages originated by the customer account comprise numeric vector encodings of one or more words in the message.

11. The method of claim 8, further comprising: clustering the respective encoded representation of each message of the plurality of electronic messages in vector space before training the autoencoder.

12. The method of claim 8, wherein determining the value reflecting the difference comprises determining a distance in vector space between the encoded representation of the new electronic message and a centroid of a nearest cluster of the encoded representations of the plurality of electronic messages.

13. The method of claim 12, wherein the value is proportional to the distance.

14. The method of claim 8, wherein the new electronic message and each message of the plurality of electronic messages comprise metadata and wherein the autoencoder is trained using both message contents and message metadata.

15. A messaging system comprising:
a memory device;
a processing device, coupled to the memory device, the processing device configured to:

receive a plurality of electronic messages originated by a customer account;

train an autoencoder by processing the plurality of electronic messages originated by the customer account, wherein the autoencoder is represented by a neural network comprising an encoding sub-network and a decoding sub-network, such that an intermediate representation of each electronic message of the plurality of electronic messages is input into the encoding sub-network, an output of the encoding sub-network is input into the decoding sub-network, and the autoencoder is trained to minimize a difference between an input of the encoding sub-network and an output of the decoding sub-network when processing messages associated with the customer account; and determine, by applying the autoencoder to a new electronic message originated by a customer account, that a value reflecting a difference between an encoded representation of the new electronic message output by the encoding sub-network and encoded representations of the plurality of electronic messages originated by the customer account output by the encoding sub-network does not satisfy a threshold value, wherein the threshold value indicates an anomaly in the new electronic message compared to the plurality of electronic messages originated by the customer account.

16. The messaging system of claim 15, wherein the processing device is further configured to:

store the plurality of electronic messages originated by the customer account in a message corpus; and remove personally identifiable information from the plurality of electronic messages originated by the customer account prior to training the autoencoder.

17. The messaging system of claim 15, wherein the encoded representations of each message of the plurality of electronic messages originated by the customer account comprise numeric vector encodings of one or more words in the message.

18. The messaging system of claim 15, wherein training the autoencoder comprises clustering the encoded representations of each message of the plurality of electronic messages in vector space.

19. The messaging system of claim 15, wherein determining the value reflecting the difference comprises determining a distance in vector space between the encoded representation of the new electronic message and a centroid of a nearest cluster of the encoded representations of the plurality of electronic messages.

20. The messaging system of claim 19, wherein the value is proportional to the distance and wherein the electronic message and each message of the plurality of electronic messages comprise metadata.

* * * * *